United States Patent
Guo et al.

(10) Patent No.: US 9,382,437 B2
(45) Date of Patent: *Jul. 5, 2016

(54) ARYLTRICARBOXYL-ATTACHED PIGMENT-BASED INKS WITH IMPROVED SLEWING DECAP

(75) Inventors: Dennis Guo, San Diego, CA (US); Kai Kong Iu, San Diego, CA (US); Xiaohe Chen, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 995 days.

This patent is subject to a terminal disclaimer.

(21) Appl. No.: 11/438,611

(22) Filed: May 19, 2006

(65) Prior Publication Data

US 2007/0076068 A1    Apr. 5, 2007

Related U.S. Application Data

(60) Provisional application No. 60/722,520, filed on Sep. 30, 2005.

(51) Int. Cl.
*C09D 11/322* (2014.01)

(52) U.S. Cl.
CPC ..................... *C09D 11/322* (2013.01)

(58) Field of Classification Search
USPC ............... 106/31.75, 31.86; 347/100
See application file for complete search history.

(56) References Cited

U.S. PATENT DOCUMENTS

| | | | |
|---|---|---|---|
| 5,922,118 A | 7/1999 | Johnson et al. | |
| 6,436,178 B1 * | 8/2002 | Hosmer | 106/31.46 |
| 6,478,863 B2 * | 11/2002 | Johnson et al. | 106/31.6 |
| 6,488,753 B1 * | 12/2002 | Ito et al. | 106/31.9 |
| 6,554,891 B1 * | 4/2003 | Momose et al. | 106/31.86 |
| 6,648,951 B2 * | 11/2003 | Chen et al. | 106/31.47 |
| 2003/0188662 A1 * | 10/2003 | Kabalnov | 106/31.27 |
| 2004/0035319 A1 * | 2/2004 | Yeh et al. | 106/31.6 |
| 2004/0244642 A1 * | 12/2004 | Uji et al. | 106/31.28 |
| 2004/0250727 A1 | 12/2004 | Jones et al. | |
| 2007/0044682 A1 * | 3/2007 | Nick et al. | 106/31.75 |

FOREIGN PATENT DOCUMENTS

| | | | |
|---|---|---|---|
| EP | 1 350 821 A1 | 10/2003 | |
| WO | WO 2006/023792 A | 3/2006 | |
| WO | WO 2008130627 A1 * | 10/2008 | |
| WO | WO 2009134247 A1 * | 11/2009 | |

* cited by examiner

*Primary Examiner* — Veronica F Faison
(74) *Attorney, Agent, or Firm* — Thorpe, North & Western L.L.P.

(57) ABSTRACT

Compositions, systems, and methods for ink-jet printing having improved slewing decap time can comprise a pigment having an aryltricarboxyl group covalently attached thereto; at least 12 wt % of an anti-slewing decap cosolvent selected from the group consisting of 2-pyrrolidone, derivatized 2-pyrrolidone, and mixtures thereof; and a liquid vehicle.

45 Claims, No Drawings

ARYLTRICARBOXYL-ATTACHED PIGMENT-BASED INKS WITH IMPROVED SLEWING DECAP

The present application claims the benefit of U.S. Provisional Application No. 60/722,520 filed on Sep. 30, 2005, which is incorporated herein by reference.

FIELD OF THE INVENTION

The present invention relates generally to pigment-based ink-jet imaging. More particularly, the present invention is drawn to aryltricarboxyl-attached pigment-based ink-jet ink compositions, and methods of printing ink-jet images with improved slewing decap.

BACKGROUND OF THE INVENTION

There are several reasons that ink-jet printing has become a popular way of recording images on various media surfaces, particularly plain paper. Some of these reasons include low printer noise, capability of high-speed recording, and multi-color recording. Additionally, these advantages can be obtained at a relatively low price to consumers. However, though there has been great improvement in ink-jet printing, accompanying this improvement are increased demands by consumers in this area, e.g., higher speeds, higher resolution, full color image formation, increased stability, higher image quality, etc.

As new ink-jet inks are developed, there are several traditional characteristics that are considered when evaluating the ink for use in conjunction with a printing surface or other inks. Such characteristics include edge acuity and optical density of the image on the surface, black to color bleed control, black to color wicking, halo control, dry time of the ink on the substrate, adhesion to the substrate, lack of deviation in ink droplet placement, presence of all dots, acceptable slewing decap time, resistance of the ink after drying to water and other solvents, long term storage stability, and long term reliability without corrosion or nozzle clogging. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements.

One problem associated with reduced line quality and accuracy of plots of certain pigment-based ink-jet inks is directly related to a problem known as capping or decap. The term "decap" is meant to be understood both here and in the appended claims as referring to the inability of an ink-jet ink to remain fluid upon exposure to air that would lead to degradation of print quality. To avoid the problems associated with decap, ink-jet architecture or pens are fired periodically at times other than when printing on a desired substrate, resulting in wasted ink-jet ink. The time between two firings is called slewing time. Thus, by increasing slewing time, less ink-jet ink is wasted and the ink-jet printer and ink-jet printing architecture or pen does not have to work as hard therefore the throughput can be improved. One method of increasing slewing time that is known in the prior art is to increase the kinetic energy of the drop ejected from the pen. However, increasing the kinetic energy also tends to increase the spray, drop weight, and/or other image quality degrading characteristics. Certain types of pigments that are otherwise very good with respect to print quality, e.g., low bleed, low wicking, low halo, fast throughput, excellent line quality, etc., often have unacceptably low slewing time. When the slewing decap time is very short, heavy spitting is required to maintain good print quality which would greatly reduce printer's throughput. Thus, it would be beneficial to provide pigment-based ink-jet ink formulations that have long slewing decap time.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a dye" includes reference to one or more of such materials.

As used herein, "vehicle" refers to ink vehicles or liquid vehicles which include liquid compositions that can be used to carry colorants to a substrate. Liquid vehicles are well known in the art, and a wide variety of ink vehicles may be used in accordance with embodiments of the present invention. Such ink vehicles may include a mixture of a variety of different agents, including without limitation, surfactants, solvents, co-solvents, buffers, biocides, viscosity modifiers, sequestering agents, stabilizing agents, and water. Vehicles can also carry other solids (other than colorants) as part of the vehicle, such as polymers, UV curable materials, plasticizers, latex particulates, etc., in some embodiments.

"Slewing" refers to the time period while an ink-jet ink architecture or pen is in an active mode, e.g., uncapped, and is in between the firing of ink drops. Typically, firing of drops onto substrate to produce an image is carried out while an ink-jet architecture is uncapped. However, each nozzle does not always fire within the time period where capping begins to occur. Thus, non-imaging small drops are fired to keep the nozzles fresh in between imaging activity. Thus, the longer the slewing decap time of a given ink-jet ink in a given ink-jet architecture or pen, the less ink that is wasted during the imaging process and the higher the printer throughput.

"Anti-slewing decap cosolvent(s)" can include cosolvent(s) that is/are added to an ink vehicle and perform the function of improving slewing decap performance, e.g., increase time between droplet firings. They are typically the solvents with high low vapor pressure and excellent water mixability.

As used herein, "colored", when referring to ink-jet inks, refers to non-black ink compositions. For example, typical colored ink compositions include cyan, magenta, yellow, and mixtures thereof.

As used herein, "pigment" refers to a colorant particle which is at least substantially insoluble in the ink vehicle in which it is used.

As used herein, "functionalized" refer to pigment particles which have a compound chemically attached via covalent bonds. This is in contrast to pigment particles which have compounds attached via ionic bonds or other weaker intermolecular forces. Aryltricarboxyl-attached pigments in accordance with embodiments of the present invention are pigments that are functionalized with aryltricarboxyl groups, e.g., aryltricarboxylic acid groups and/or aryltricarboxylate groups.

When referring to an "aryltricarboxyl" group (including aryltricarboxylic acids and aryltricarboxylates), it is understood that the term "tri" refers to at least three carboxyl groups present on a common aryl group. Thus, tricarboxyl includes tetracarboxyl, pentatricarboxyl, etc., as each of these functional groups include at least three carboxyl groups present on a common aryl group. It is further understood that the aryl group can be any single aryl group, such as benzene, naphthalene, biphenyl, etc. Any intervening atoms between two aryl groups would be considered multiple aryl groups. In other words, if multiple aryl groups are present, in order to qualify as an aryltricarboxyl group as defined herein, at least one of the multiple aryl groups would include at least three carboxyl groups.

As used herein, "bleed" refers to the tendency of ink to run into and mix with adjacently printed inks. Bleed typically occurs prior to adjacently printed inks fully drying on a substrate. The degree of bleed will depend on a variety of factors such as the drying speed of the ink, ink chemistry, e.g., the presence of reactive or non-reactive bleed control mechanisms, and type of substrate, among other variables. In accordance with embodiments of the present invention, bleed can be reduced without the use of a reactive ink mechanism, though reactive ink mechanism can also be used.

The term "halo" or "halo effect" refers to a white or grayish band that can appear at the interface of black and colored inks which occurs as a result of liquid or colorant migration.

"Wicking" refers to migration of ink from an image along paper fibers, thereby creating a ragged edge. A more ragged edge or interface between two printed inks is indicative of increased wicking.

As used herein, "carboxyl," or "carboxyl group," or the like refers to a carboxylic acid group (COOH) or a carboxylate salt thereof (COOM). Appropriate counterions (M) for the salt can include alkali metals such as sodium, lithium, or potassium; positively charged amines such as $NH_4^+$, $(CH_3)_4N^+$, $(CH_3)_3NH_4^+$; or the like.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1% to about 20% should be interpreted to include not only the explicitly recited concentration limits of 1% to about 20%, but also to include individual concentrations such as 2%, 3%, 4%, and sub-ranges such as 5% to 15%, 10% to 20%, etc.

In the ink-jet arena, it is typically desired that all ink drops printed on a substrate look substantially similar to one another so that high quality images can be produced. Inherently working against this goal is the fact that ink is not continuously jetted from an ink-jet architecture during the imaging process, i.e. there is period of slewing where printing orifices are uncapped in between each jetting series. When uncapped, inks tend to crust very quickly due in part to the small orifice sizes of the jetting architecture. This phenomenon is know as slewing decap.

When ink-jet inks at a printing orifice begin to crust, the print quality that can be achieved is diminished. It is known that capping that occurs during slewing can be substantially prevented by systematically firing the pen in the form of a "spitting" process when the pen is not printing on the target substrate in order to keep the printing orifice fresh. This spitting process wastes a certain amount of ink-jet ink and time. In other words, in order to keep the ink-jet pen orifice fresh and ready for printing when a pen is in an active printing mode, the pen will waste some ink and time to avoid orifice capping.

In accordance with this, it is generally known that pigment-based inks can provide better optical density and text print quality compared to dye based black inks. In particular, certain functionalized pigment-based ink-jet inks can produce excellent image quality, but the slewing decap time of some of these types of inks is unacceptably low. Specifically, pigments that are surface functionalized (by covalent attachment) with aryltricarboxyl groups, and more particularly, pigments functionalized with 3,4,5-benzenetricarboxylic acids or 3,4,5-benzenetricarboxylates provide excellent image quality, but typically contribute to low slewing decap time when formulated in an ink-jet ink composition. In accordance with this problem, it has been recognized that by including a high load of 2-pyrrolidone, slewing decap time can be significantly increased without significantly reducing print quality. By a high load, what is meant is at least 12 wt %. More specifically, a 2-pyrrolidone load of from 12 wt % to about 25 wt % provides acceptable results. In one specific embodiment, the load of 2-pyrrolidone can be about 16 wt %.

In accordance with these discoveries, an ink-jet ink composition can comprise a pigment having an aryltricarboxyl group covalently attached thereto; at least 12 wt % of an anti-slewing decap cosolvent selected from the group consisting of 2-pyrrolidone, derivatized 2-pyrrolidone, and mixtures thereof; and a liquid vehicle.

In another embodiment, a method for increasing slewing time of an ink-jet ink architecture without significant decap can comprise providing an ink-jet ink, loading the ink-jet ink in an ink-jet architecture, configuring the ink-jet architecture to allow for slewing of at least 3 seconds between firing without the requirement of capping the architecture during said slewing. The ink-jet ink can comprise a pigment having an aryltricarboxyl group covalently attached thereto; at least 12 wt % of an anti-slewing decap cosolvent selected from the group consisting of 2-pyrrolidone, derivatized 2-pyrrolidone, and mixtures thereof; and a liquid vehicle.

In another embodiment, a system of printing high quality images with reduced slewing decap can comprise an ink-jet ink, and an ink-jet architecture configured for firing non-image producing drops of the ink-jet ink at intervals of at least 3 seconds when the ink-jet architecture is uncapped and is not actively imaging. The ink-jet ink can comprise a pigment having an aryltricarboxyl group covalently attached thereto; at least 12 wt % of an anti-slewing decap cosolvent selected from the group consisting of 2-pyrrolidone, derivatized 2-pyrrolidone, and mixtures thereof; and a liquid vehicle.

As mentioned, aryltricarboxyl-functionalized pigments provide excellent text quality and optical density on plain paper compared to many other similar pigments. It has excellent performance with respect to high throughput and text quality. Though this pigment has been useful in more traditional printing process, e.g., other than ink-jet imaging, it has not been successfully used in the ink-jet arts because of poor decap. For example, decap of this pigment using more traditional inkjet ink vehicles has been less than one second, which is unacceptable for a typical commercial ink-jet printer. In other words, though this pigment can be used quite easily in other applications that do not have the same demands inherently present with ink-jet architecture, it is not a simple process of taking a known ink vehicle used in another ink-jet printing field, add this pigment to the vehicle, and expect that it would be printable using ink-jet printing architecture. This would not be the case because of the significant slewing decap problems associated with this particular type of pigment. The use of high loads of 2-pyrrolidone has solved this inherent problem.

The pigment that is attached to the aryltricarboxyl group can be almost any commercially available pigment that provides acceptable print characteristics. In one embodiment, the base pigment is a carbon black pigment. Carbon black pigments suitable for use in the present invention include, without limitation, carbon black, graphite, vitreous carbon, charcoal, and combinations thereof. In one aspect of the present invention, the carbon pigment is a carbon black pigment. Such carbon black pigments can be manufactured by a variety of known method such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, BP-700, CAB-O-JET 200, and CAB-O-JET 300; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V; and TIPURE R-101 available from Dupont. Typically the carbon pigments of the present invention can be from about 10 nm to about 10 micrometers and in one aspect can be from 10 nm to about 500 nm in diameter, although sizes outside this range can be used if the pigment can remain dispersed and provide adequate color properties. Typically, the base carbon is covalently attached by aryltricarboxyl groups to become dispersable in an aqueous vehicle. Though the use of carbon black pigments is exemplary of embodiments of the present invention, in another embodiment, the base pigment can be a color pigment. Color base pigments that can be used include, but are not limited to, cyan, magenta, yellow, and other secondary colors such as red, orange, green, blue and violet.

These chemically attached aryltricarboxyl dispersants not only impart improved dispersion properties to the ink composition, but also contribute to a high degree of black to color and color to color bleed control, reduced wicking, improved halo, and general image edge acuity. Those skilled in the art will recognize that such aryltricarboxyl groups can be present in acid form or can also be present in their salt form, depending on the components in the ink-jet ink composition. In one detailed aspect of the present invention, the dispersant can have the following chemical structure (Formula I), where the "*" indicates a point of attachment to the carbon pigment, either directly or through a known spacer grouping, as follows:

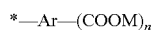   Formula I where Ar is aryl, n is at least 3, e.g., from 3-5, and M is H or a monovalent cation, e.g., $Na^+$, $Li^+$, $K^+$, or positive charge organic species such as $NH_4^+$, $(CH_3)_4N^+$, or $(CH_3)_3NH_4^+$. Exemplary structures that can be prepared and attached to a black pigment in accordance with Formula I are shown as follows:

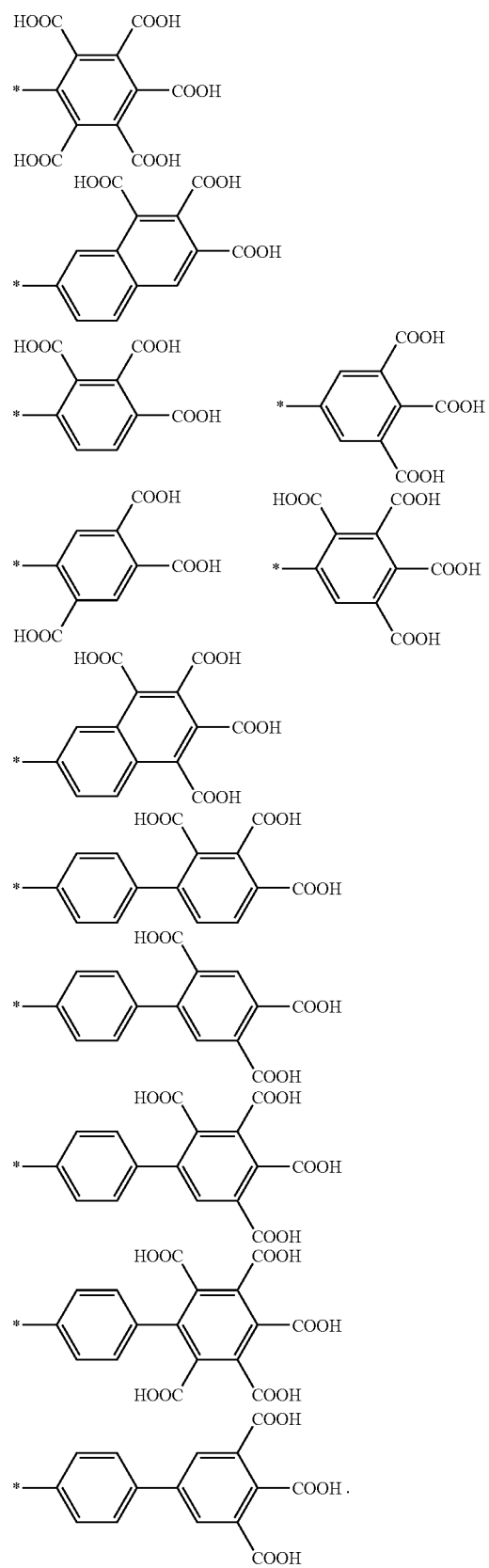

It is noted that all of the above examples are aryltricarboxyl groups in that they each include at least three carboxyl groups on a common aryl group as defined herein. It is also noted that the biphenyl groups shown above are considered to be a single aryl group because there are no intervening atoms between the two benzene groups. Further, though all of the example formulations shown above are in the carboxylic acid state, it is recognized that the hydrogen of each carboxylic acid can be replaced by a monovalent cation to form a salt thereof, as described in Formula I. As a further note, the functional groups defined in Formula I and by way of example above can be attached to carbon black pigment surfaces using amino or other mechanisms of reactive attachment. For example, a 1-amino 3,4,5-benzenetricarboxylic acid can be used to attach a 3,4,5-benzenetricarboxylic acid to a pigment surface, resulting in a 1-pigment-3,4,5-benzenetricarboxylic acid. In this example, the amino group can act as leaving group which facilitate attachment to the pigment. This being stated, these dispersants can be functionalized onto the carbon pigment by any of a number known method. For example, U.S. Pat. Nos. 5,554,739 and 5,707,432, each of which is hereby incorporated by reference in their entirety to the extent consistent with the present disclosure, disclose methods of functionalizing carbon materials using diazonium salts.

In one detailed aspect of the present invention, the functionalized pigment comprises from about 1% to about 20% by weight of the ink-jet ink composition, and often can comprise from about 2% to about 6% by weight of the ink-jet ink composition. When using an ink-jet ink to print against the ink-jets inks of the present invention, colored or black pigments or dyes can be used. The weight percentages of the pigment in these secondary inks can be about the same as recited with respect to the functionalized carbon pigments described above, or any other concentration generally known in the art. When using colored dyes in the colored ink-jet ink to be printed against the aryltricarboxyl-containing ink-jet ink, the dye can typically be present in the ink-jet ink at from 1 wt % to about 10 wt %.

Regarding the liquid or ink vehicles described herein, the components discussed are generally relevant to both pigment-based ink-jet inks and dye-based ink-jet inks. Thus, to the extent that both types of inks are discussed herein, the discussion of such vehicles is applicable to both types of inks.

The ink-jet ink compositions of the present invention are typically prepared in an aqueous formulation or ink vehicle which can include water, cosolvents, surfactants, buffering agents, biocides, sequestering agents, viscosity modifiers, humectants, binders, and/or other known additives. In one aspect of the present invention, the ink vehicle can comprise from about 70% to about 98% by weight of the ink-jet ink composition. Further, other than the liquids of the vehicle, solids can also be dispersed it the liquid vehicle, such as polymers, photo curable materials, plasticizers, latex particulates, etc.

As described, cosolvents can be included in the ink-jet compositions of the present invention. Suitable cosolvents for use in the present invention include water soluble organic cosolvents, but are not limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, cosolvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol)alkyl ethers, higher homologs of poly(ethylene glycol)alkyl ethers, poly(propylene glycol)alkyl ethers, higher homologs of poly(propylene glycol)alkyl ethers, lactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. Cosolvents can be added to reduce the rate of evaporation of water in the ink to minimize clogging or other properties of the ink such as viscosity, pH, surface tension, optical density, and print quality. The cosolvent concentration can range from about 0 wt % to about 50 wt %, and in one embodiment is from about 15% to about 40% by weight. In accordance with embodiments of the present invention, the liquid vehicle can include at least 12 wt % of the cosolvent 2-pyrrolidone. In another embodiment, the 2-pyrrolidone can be present at from 12 wt % to 20 wt %. In still another embodiment, the 2-pyrrolidone can be present at from 14 wt % to 18 wt %. The high load of 2-pyrrolidone can be present solely as non-derivatized 2-pyrrolidone (with other optional cosolvents), solely as a derivatized 2-pyrrolidone, e.g., 1-methyl-2-pyrrolidone, 3-methyl-2-pyrrolidone, 4-methyl-2-pyrrolidone, 5-methyl-2-pyrrolidone, 1-ethyl-2-pyrrolidone, 3-ethyl-2-pyrrolidone, 4-ethyl-2-pyrrolidone, 5-ethyl-2-pyrrolidone, 5-(hydroxylmethy)-2-pyrrolidone, 1-(2-hydroxyethyl)-2-pyrrolidone, etc., or as a mixture of 2-pyrrolidone and a derivatized 2-pyrrolidone.

Various buffering agents can also be optionally used in the ink-jet ink compositions of the present invention. Typical buffering agents include such pH control solutions as inorganic and organic buffer agents.

In another aspect of the present invention, various biocides can be used to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5% by weight of the ink-jet ink composition and often from about 0.1% to about 0.25% by weight.

In an additional aspect of the present invention, binders can be included which act to secure the colorants on the substrate. Binders suitable for use in the present invention typically have a molecular weight of from about 100 to about 50,000 g/mol. Non-limiting examples include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof.

In one aspect of the present invention, the ink-jet ink compositions can include surfactants. Such surfactants can include standard water-soluble surfactants such as alkyl polyethylene oxides, alkyl phenyl polyethylene oxides, polyethylene oxide (PEO) block copolymers, acetylenic PEO, PEO esters, PEO amines, PEO amides, and dimethicone copolyols. If used, surfactants can be from 0.01% to about 10% by weight of the ink-jet ink composition. Various combinations of nonionic, anionic, and/or amphoteric surfactants can also be used.

In another aspect of the present invention, color pigmented inks containing pigment in accordance with Formula I can be prepared in a vehicle described above for the black pigmented inks. Colors inks include, but are not limited to, cyan, magenta, yellow, and other secondary colors such as red, orange, green, blue and violet.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

Ink Vehicle Preparation

Two ink-jet ink vehicles were prepared in accordance with Table 1, as follows:

| Component | Ink vehicle type 1 | Ink vehicle type 2 |
| --- | --- | --- |
| 2-pyrrolidone | 10 wt % | 16 wt % |
| [1]Decap friendly cosolvent | 10 wt % | 4 |
| [2]Other cosolvent | 2 wt % | 2 wt % |
| Fluorinated surfactant | 0.0075 wt % | 0.0075 wt % |
| Acetylenic dispersant | 0.15 wt % | 0.15 wt % |
| Tris(hydroxymethyl)aminomethane | 0.10 wt % | 0.10 wt % |
| Styrene polymeric dispersant | 0.70 wt % | 0.70 wt % |
| Water | Balance | Balance |

[1]High boiling point cosolvents that are readily dissolvable in water, including cosolvents are generally used in the art to improve decap performance. Examples include glycerol, diethylene glycol, triethylene glycol, polyethylene glycol, dipropylene glycol, tripropylene glycol, Dantocol DHE, ethylhydroxy methylpropanediol, 1,2-pentanediol, 1-(2-hydryoxyethyl)-2-imidazolidinone, N-methylmorpholine-N-oxide, tetraethylene glycol, 2-methyl-1,3-propanediol, mixtures thereof, etc.
[2]Standard cosolvents often used in the thermal ink-jet ink arts. Examples include liponics ethoxylated glycol-1, etc.

Example 2

Slewing Decap Performance

Slewing decap performance tests were conducted using various ink formulations containing pigment with structure of Formula I and Ink vehicle type 1 and Ink vehicle type 2 by allowing multiple predetermined slewing times to occur (e.g., 1 second, 2 seconds, 3 seconds, etc.) prior to printing a thin line with crisp edges. As capping typically causes clogging or misfiring of jetting orifices, when capping has occurred, line quality is significantly reduced. Each of the printed characters is compared to determine whether acceptable print quality was achieved. Any noticeable failure in the crispness of the line is considered to be failure. The slewing decap time is determined by evaluating the lines the have acceptable print quality compare to the lines that have unacceptable print quality. For example, if a line has acceptable print quality after 5 seconds of stewing, and unacceptable print quality after 6 seconds of slewing, then the slewing decap time is 5 seconds.

In comparing the slewing decap time between the various inks of Ink vehicle type 1 and Ink vehicle type 2, it was discovered that the decap time for Ink type 1 was generally less than one second, whereas the slewing decap time for Ink type 2 was generally about 8 seconds or higher. This dramatic improvement in slewing decap time that was achieved by increasing the load of 2-pyrrolidone (2P) in the ink-jet ink from 10 wt % to 16 wt % was unexpected because of the relatively high vapor pressure of this cosolvent as compared to many of the decap friendly co-solvents. In other words, 2-pyrrolidone is not typically considered to be a solvent that contributes significantly to slewing decap performance, yet by increasing its level to a very high load (replacing more traditional slewing decap cosolvents), dramatic improvement, i.e. from <1 second to 8 seconds, was achieved. Additionally, there appeared to be no significant image quality or other performance trade offs that were incurred by including such a high load of 2-pyrrolidone in the ink-jet ink formulation.

Example 3

Slewing Decap Performance for Arylmonocarboxyl-, Aryldicarboxyl- and Polymer-Attached Pigments Slewing decap performance tests were conducted as above using various ink formulations containing arylmonocarboxyl-, aryldicarboxyl- and polymer-attached pigments in Ink vehicle type 1 and Ink vehicle type 2. The slewing decap time of these inks were found to be at least 6 seconds. No decap difference was observed for inks with Ink vehicle type 1 and Ink vehicle type 2. This indicates that the 2-pyrrolidone requirement for decap performance is not necessary for polymer-attached pigments and pigment types where there are less than three carboxyl groups present on a common aryl group.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. An ink-jet ink composition, comprising:
   (a) colorant consisting of pigment particles, the pigment particles comprising a pigment having an aryltricarboxyl group covalently attached thereto;
   (b) from 14 wt % to 18 wt % of an anti-slewing decap cosolvent selected from the group consisting of 2-pyrrolidone, derivatized 2-pyrrolidone, and mixtures thereof; and
   (c) a liquid vehicle.

2. The ink-jet ink of claim 1, wherein the aryltricarboxyl group is an aryltricarboxylic acid.

3. The ink-jet ink of claim 1, wherein the aryltricarboxyl group is an aryltricarboxylate having sodium, lithium, potassium, or a positively charged amine as its counterion.

4. The ink-jet ink of claim 1, wherein the aryltricarboxyl group is a benzenetricarboxyl group.

5. The ink-jet ink of claim 1, wherein the aryltricarboxyl group is a napthalenetricarboxyl group or a biphenyltricarboxyl group.

6. The ink-jet ink of claim 1, wherein the aryltricarboxyl group is a 3,4,5-benzenetricarboxylic acid, where the pigment is attached at the 1-position of the 3,4,5-benzenetricarboxylic acid.

7. The ink-jet ink of claim 1, wherein the aryltricarboxyl group is a 3,4,5-benzenetricarboxylate having sodium, lithium, potassium, or a positively charged amine as its counterion, where the pigment is attached at the 1-positon of the 3,4,5-benzenetricarboxylate.

8. The ink-jet ink of claim 1, wherein the pigment is carbon black.

9. The ink-jet ink of claim 1, wherein the anti-slewing decap cosolvent consists essentially of the 2-pyrrolidone.

10. The ink-jet ink of claim 1, wherein the ink-jet ink composition has an uncapped slewing capability of at least 5 seconds without a substantial reduction in print quality.

11. The ink-jet ink of claim 1, wherein the ink-jet ink composition has an uncapped slewing capability of at least 8 seconds without a substantial reduction in print quality.

12. The ink-jet ink of claim 1, wherein the aryltricarboxyl group is an aryltetracarboxyl group.

13. The ink-jet ink of claim 1, wherein the aryltricarboxyl group is an arylpentacarboxyl group.

14. A method for increasing slewing time of an ink-jet ink architecture without significant decap, comprising:
(a) providing an ink-jet ink, comprising:
(i) colorant consisting of pigment particles, the pigment particles comprising a pigment having an aryltricarboxyl group covalently attached thereto,
(ii) at least 12 wt % of an anti-slewing decap cosolvent selected from the group consisting of 2-pyrrolidone, derivatized 2-pyrrolidone, and mixtures thereof, and
(iii) a liquid vehicle;
(b) loading said ink-jet ink in an ink-jet architecture; and
(c) configuring the ink-jet architecture to allow for slewing of at least 5 seconds between firing without the requirement of capping the architecture during said slewing, and without a substantial reduction in print quality.

15. The method of claim 14, wherein the aryltricarboxyl group is an aryltricarboxylic acid.

16. The method of claim 14, wherein the aryltricarboxyl group is an aryltricarboxylate having sodium, lithium, potassium, or a positively charged amine as its counterion.

17. The method of claim 14, wherein the aryltricarboxyl group is a benzenetricarboxyl group.

18. The method of claim 14, wherein the aryltricarboxyl group is a napthalenetricarboxyl group or a biphenyltricarboxyl group.

19. The method of claim 14, wherein the aryltricarboxyl group is a 3,4,5-benzenetricarboxylic acid, where the pigment is attached at the 1-positon of the 3,4,5-benzenetricarboxylic acid.

20. The method of claim 14, wherein the aryltricarboxyl group is a 3,4,5-benzenetricarboxylate having sodium, lithium, potassium, or a positively charged amine as its counterion, where the pigment is attached at the 1-positon of the 3,4,5-benzenetricarboxylate.

21. The method of claim 14, wherein the pigment is carbon black.

22. The method of claim 14, wherein the anti-slewing decap cosolvent consists essentially of the 2-pyrrolidone.

23. The method of claim 14, wherein the anti-slewing decap cosolvent is present at from 12 wt % to 25 wt %.

24. The method of claim 14, wherein the anti-slewing decap cosolvent is present at from 14 wt % to 18 wt %.

25. The method of claim 14, wherein the step of configuring the ink-jet architecture includes configuring the ink-jet architecture to allow for slewing of at least 8 seconds between firing without the requirement of capping the architecture during said slewing.

26. The method of claim 14, wherein the aryltricarboxyl group is an aryltetracarboxyl group.

27. The method of claim 14, wherein the aryltricarboxyl group is an arylpentacarboxyl group.

28. A system of printing high quality images with reduced slewing decap, comprising:
(a) an ink-jet ink, comprising:
(i) colorant consisting of pigment particles, the pigment particles comprising a pigment having an aryltricarboxyl group covalently attached thereto,
(ii) at least 12 wt % of an anti-slewing decap cosolvent selected from the group consisting of 2-pyrrolidone, derivatized 2-pyrrolidone, and mixtures thereof, and
(iii) a liquid vehicle;
wherein the ink-jet ink composition has an uncapped slewing capability of at least 5 seconds without a substantial reduction in print quality; and
(b) an ink-jet architecture configured for firing non-image producing drops of the ink-jet ink at intervals of at least 5 seconds when the ink-jet architecture is uncapped and is not actively imaging.

29. The system of claim 28, further comprising a substrate for accepting the ink-jet ink when the ink-jet architecture is actively imaging.

30. The system of claim 29, wherein the substrate is plain paper.

31. The system of claim 28, wherein the aryltricarboxyl group is an aryltricarboxylic acid.

32. The system of claim 28, wherein the aryltricarboxyl group is an aryltricarboxylate having sodium, lithium, potassium, or a positively charged amine as its counterion.

33. The system of claim 28, wherein the aryltricarboxyl group is a benzenetricarboxyl group.

34. The system of claim 28, wherein the aryltricarboxyl group is a napthalenetricarboxyl group or a biphenyltricarboxyl group.

35. The system of claim 28, wherein the aryltricarboxyl group is a 3,4,5-benzenetricarboxylic acid, where the pigment is attached at the 1-positon of the 3,4,5-benzenetricarboxylic acid.

36. The system of claim 28, wherein the aryltricarboxyl group is a 3,4,5-benzenetricarboxylate having sodium, lithium, potassium, or a positively charged amine as its counterion, where the pigment is attached at the 1-positon of the 3,4,5-benzenetricarboxylate.

37. The system of claim 28, wherein the pigment is carbon black.

38. The system of claim 28, wherein the anti-slewing decap cosolvent consists essentially of the 2-pyrrolidone.

39. The system of claim 28, wherein the anti-slewing decap cosolvent is present at from 12 wt % to 25 wt %.

40. The system of claim 28, wherein the anti-slewing decap cosolvent is present at from 14 wt % to 18 wt %.

41. The system of claim 28, wherein the ink-jet architecture is configured for firing non-image producing drops of the ink-jet ink at intervals of at least 8 seconds.

42. The method of claim 28, wherein the aryltricarboxyl group is an aryltetracarboxyl group.

43. The method of claim 28, wherein the aryltricarboxyl group is an arylpentacarboxyl group.

44. An ink-jet ink composition, comprising:
(a) colorant consisting of pigment particles, the pigment particles comprising a pigment having an aryltricarboxyl group covalently attached thereto;
(b) at least 16 wt % of an anti-slewing decap cosolvent selected from the group consisting of 2-pyrrolidone, derivatized 2-pyrrolidone, and mixtures thereof; and
(c) a liquid vehicle.

45. The ink-jet ink of claim 1, wherein the ink-jet ink composition has an uncapped slewing capability of at least 5 seconds without a substantial reduction in print quality.

* * * * *